Dec. 5, 1961    M. W. TOEPPER ET AL    3,011,895
METHOD FOR PREPARING SHAPED MEAT PRODUCTS
Filed Dec. 9, 1958    4 Sheets-Sheet 1
Fig. 1.
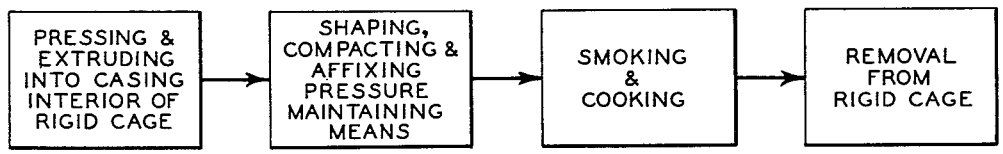
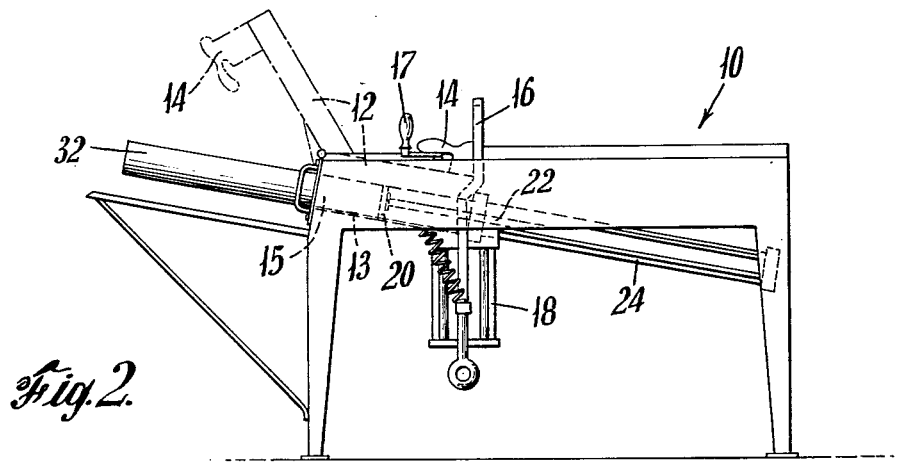
Fig. 2.
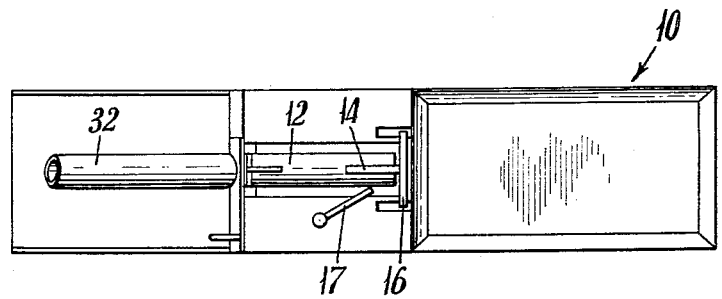
Fig. 3.
INVENTORS
MARVIN W. TOEPPER
HOWARD E. KASTING
BY
ATTORNEY Dec. 5, 1961 M. W. TOEPPER ET AL 3,011,895
METHOD FOR PREPARING SHAPED MEAT PRODUCTS
Filed Dec. 9, 1958 4 Sheets-Sheet 3

INVENTORS
MARVIN W. TOEPPER
HOWARD E. KASTING

BY
ATTORNEY

//3,011,895
//Patented Dec. 5, 1961

3,011,895
METHOD FOR PREPARING SHAPED MEAT PRODUCTS
Marvin W. Toepper, Brookfield, and Howard E. Kasting, Park Forest, Ill., assignors to Union Carbide Corporation, a corporation of New York
Filed Dec. 9, 1958, Ser. No. 779,238
6 Claims. (Cl. 99—107)

This invention relates to a novel method and apparatus for preparing shaped meat products in cellulose casings. More specifically it relates to such a method and apparatus incorporating novel stuffing and pressing means to obtain a product having substantially square ends.

The manufacture and sale of sausage in the United States today is a major commercial enterprise. The 1957 total production was about several billion pounds, of which meat loaves, cooked and smoked meat rolls, constituted about 40 percent of this figure.

The upgrading of meat cuts by trimming, boning, seasoning, curing, shaping, and further preparation as by cooking and/or smoking, is an essential part of such meat packing operations.

Modern meat marketing developments have placed increasing emphasis on demands for unitized packages of pre-sliced meats, useful for sandwiches or other ready-to-serve table preparations. For such packages, the meat item is preferred in the form of a dense, homogeneous uniform chunk or slice, substantially free of voids and in a rectangular shape.

Such type of meat shaping is desirable for merchandising, smoked or cooked boneless hams, cooked corned beef, boneless beef rolls, boneless poultry and comminuted meats (sausage and meat loaves).

Slicing and unit packaging of previously processed cooked and smoked meats, is commonly done on high-speed automatic equipment. For efficient operation, such class of machinery demands as uniform size and density of meat product as it is possible to obtain. For example, a variation of plus or minus one-eighth of an inch will cause one commonly used type of automatic packaging machine to operate poorly.

Typical of methods now practiced for such items is the preparation of cooked hams and loin rolls. After being chilled and cut from the carcasses, hams are trimmed and graded according to quality and weight. The first operation in cooked ham manufacture, after curing, occurs in the ham boning department. The meat is loosened from around the bones and separated therefrom. The individual hams are shaped by hand and may be placed into containers, such as "ham retainers" or "ham boilers," for molding and cooking the ham to desired shapes. If such molds are too large for the specific ham, the corners will not be properly filled, thereby yielding an undesirable loose product having occasional voids in individual slices. Sometimes parchment paper or polyethylene film is used as a lining for the retainer to protect the ham from surface discoloration, and to close and smooth the outside of the ham for improved appearance.

Other methods have been developed to yield a more uniform and better closed and shaped product for automatic packaging operations. These methods involve the shaping of the meat items under high pressure to express the voids from the bone cavity of the meat mass and solidify and shape it, which may be done in various types of compacting mold presses actuated by pneumatic or hydraulic means. Such presses operate generally, to shape the meat item under momentary high pressure in a forming chamber designed with contracting walls to press, solidify, and compact the meat mass in girth and length, and to extrude it lengthwise through a horn into flexible, tubular casings permeable or impermeable to smoke or alternately into permanent metal molds.

Metal molds may be cylindrical or rectangular but are generally useful only for shaping meat items preparatory to cooking, and are not applicable for preparation of smoked meat items. It is not always possible to avoid jelly and air pockets in filling such metal molds. Usually, an extensive and costly inventory of permanent molds must be maintained to accommodate the volume of production throughout the processing and holding cycles of operations. After each use, the metal molds must be thoroughly washed and cleaned. Usually they are also coated on the interior after each use, with a thin layer of material which promotes the release of the meat mass after processing; or, alternately, they are provided with parchment paper or plastic liners.

On the other hand, the use of tubular cellulosic casings permeable to smoke, for compacting and shaping meat items, has many economic advantages over operations using metal molds. Casings may be used to envelop the the meat product extruded from the press and, after suitable closure of the casing ends, may be used for either, or both, cooking and smoking operations. Such casings permit visual inspection of the enveloped product before processing and permit manipulation by pricking and kneading the meat mass to eliminate unsightly and objectionable air or jelly pockets. Such casing being disposable may remain on the product for protection throughout all subsequent processing and molding operations. Prior to slicing and packaging, the casing may be stripped and disposed of—or alternately, be allowed to remain on chunks or slices which are then packaged and marketed as such to the customer. Items to be cooked in cellulosic casings require a shorter processing time cycle than an equivalent product processed in metal molds. Cellulosic casings being sanitary and disposable require no cleaning or sterilization prior to use. Consequently, they permit greater flexibility of processing operations, particularly in inventory molding cycles. Metal molds are heavy and subject to damage in handling operations.

Processing by smoking yields a more valuable product than water cooking only. Such items generally have superior flavor and color and less shrinkage than equivalent cooked items. Meats processed in dry heat and smoke yield a superior skin formation of meat directly under the enveloping casing, thereby promoting longer "shelf life" and better flavor of the product.

However, the shaping of meat items in casings to the accuracy and sizes necessary in modern automatic packaging operations is very difficult, particularly with reference to square shape when using meats such as boned ham, boned beef rolls, boned poultry, etc. One method of improving finished dimensional control of boned meat items which are to be processed by cooking, has been to place the casing-enveloped meat in square-shaped, fenestrate wire shaping cages which are hinged to facilitate placing the encased meat item therein. In practicing this method, the casing-enveloped meat item is placed in one-half (L-shaped) of the opened wire cage and the cooperating companion one-half is swung closed and fastened, thereby initially lightly compressing the meat item in girth therewithin. But with this method it is difficult to make the meat mass fill out the longitudinal corners of rectangular fenestrate shaping cages. Next the filled cage is placed in a compacting press which, in two separate operations, successively forces an end plate against each end of the meat mass restrained therewithin by the side walls of the cage, each end plate being locked in place. Then the filled cage is further processed such as by cooking or smoking. After the processing the encased meat is removed from the cage and is ready for slicing and packaging.

With this process, the initial compression of the meat mass in the cage somewhat squares-up the ends of the meat and expels most of the voids resulting from the boning operation. However, the natural shrinkage of the meat during subsequent cooking or smoking processes reduces the effectiveness of the end plates to yield a flattened squared end to the shaped meat item. This latter effect is especially important in automatic packaging operations as formerly about 6–8 percent of the slices from boneless smoked items were undersized and had to be discarded.

It may thus be seen that former stuffing and shaping practices utilizing cellulosic casings and fenestrate shaping cages proved unsatisfactory for initially making the stuffed casing conform to the girth dimensions of the cage and additionally presented the problem of having no means for maintaining pressure on the ends of the stuffed casing during processing to compensate for meat shrinkage.

It is accordingly an object of this invention to provide a method and apparatus for obtaining a superior shaped meat product.

It is a further object to provide such a method and apparatus which produces a meat of uniform density and having substantially square ends.

It is a further object to provide a method for stuffing a meat product into a tubular casing material interior of a fenestrate cage.

It is a still further object to provide a method and apparatus for maintaining pressure on the ends of an encaged meat product during the entire processing cycle.

Other objects and advantages will be apparent from the description and drawings in which:

FIG. 1 is a block diagram illustrating the method steps of the instant process;

FIG. 2 is a side elevation, partly in section, of a meat forming press with attached extrusion horn for compressing the meat product and forcing it into a tubular cellulose casing;

FIG. 3 is a plan view of FIG. 2;

Figure 4:
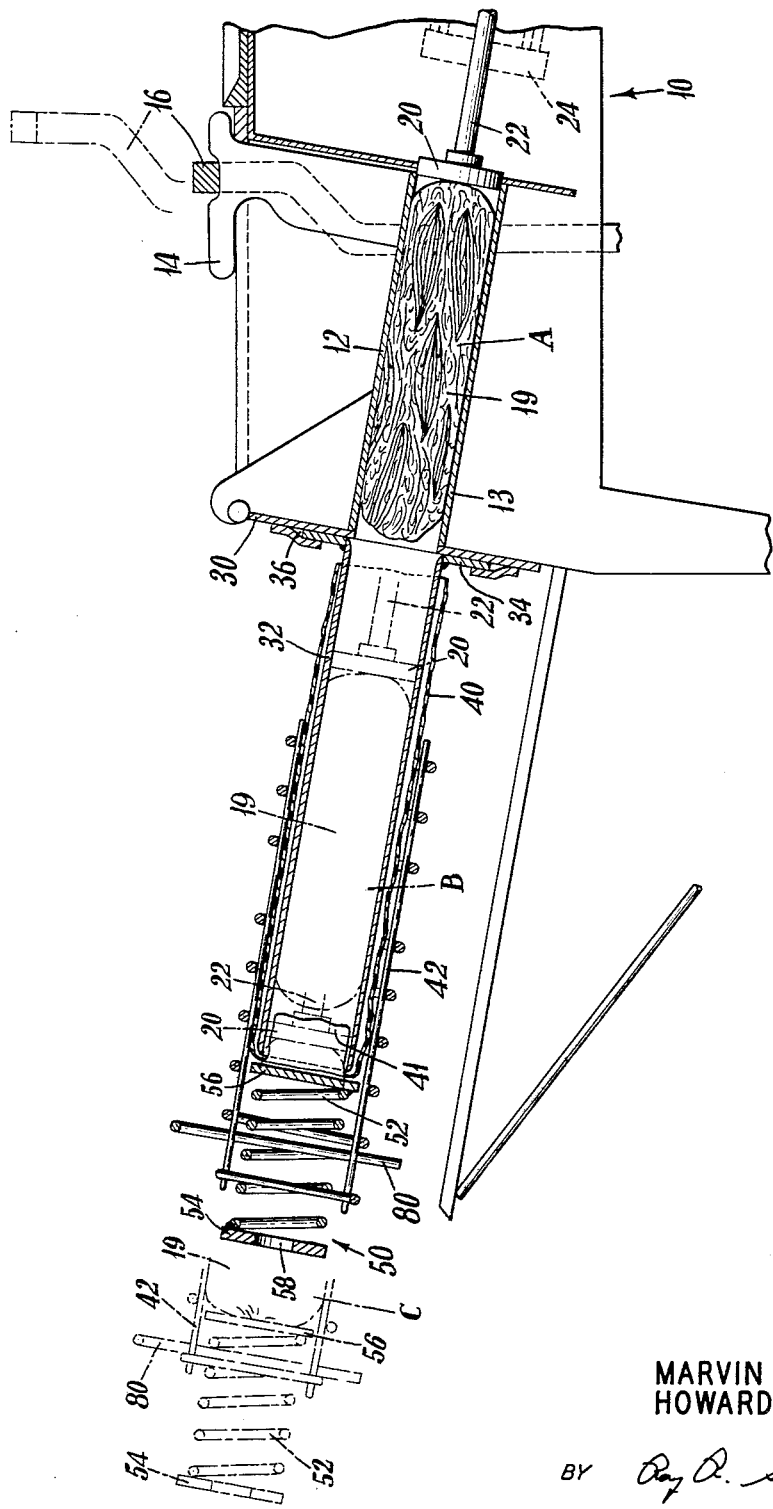
FIG. 4 is an enlarged side elevation in section of the horn, casing and cage, and portion of meat forming press and stuffing horn.

According to the invention there is provided a method and apparatus for preparing a shaped and packaged meat product which comprises generally the stuffing of a meat product into a cellulose casing while positioned completely interior of a fenestrate cage, applying axial pressure to both ends of the stuffed casing to compress and shape the meat product within the casing and to mold it to the interior dimensions of the fenestrate cage, and maintaining said end pressure on the encased meat product during subsequent processing steps.

The invention comprises two particularly novel aspects; firstly, the stuffing of the meat product into casing in place within the fenestrate shaping cage; and secondly, the concurrent application of pressure to both ends of the stuffed casing interior to the cage and maintaining said pressure during the entire processing cycle which may comprise cooking and/or smoking. The term square end so used herein refers to a flat end having a negligible radius of curvature where it abuts the adjoining sides.

The stuffing of the casing in place within the cage is accomplished by extruding the meat by means of a novel association of stuffing horn, casing, and cage which will be more fully described hereinafter. By stuffing the meat into the casing within the fenestrate cage the separate step of placing an encased meat item into the cage is avoided, and the casing can be stuffed with sufficient pressure to cause the encased article to fully fill out and conform to the cage shape to an extent not previously possible. This effect is of particular significance with non-comminuted meats such as boned ham, beef rolls, boned turkey, corned beef, etc. which have bone voids and are irregular in shape by nature and do not easily mold into a uniformly compact product.

The placing of pressure concurrently on both ends of the encaged meat is accomplished by using two slidable end plates within the fenestrate cage as will be more fully described below.

In the prior art pressing practices the compacting pressure is successively applied to each end of the encaged meat mass and the resultant pressure reaction is restrained by friction of the meat mass on the cage side walls. Concurrent pressurizing of both ends of the encased meat mass is independent of pressure reaction on the cage side walls, and this permits using higher compacting pressures than common in prior art, thereby yielding a more uniformly compacted meat mass.

The pressing pressure in the instant invention is maintained on the encased meat by the end plates throughout the processing cycle by means of resilient means associated with the end plates and locking means which maintain the resilient means in compressed condition also to be fully described hereinafter. The maintenance of the pressure on the encaged article throughout the cooking operation is of great importance in maintaining the square ends and maximum density of the final product as set forth previously since as the meat shrinks the end plates are continuously forced against same, maintaining maximum density and the said square ends. The invention is especially useful when used with cellulosic casings permeable to both air or smoke since the meat shrinks as it is cooked or smoked.

Specific details of a preferred apparatus utilized to accomplish the instant process will now be described with reference to the drawings.

The block diagram of FIG. 1 illustrates schematically the process of the instant invention. In the case of comminuted meats the "compressing" step comprises stuffing the casing with meat emulsion by means such as a pneumatic stuffer. In the case of the boned or rolled meats this step comprises shaping and compressing in a suitable press.

In stuffing, the meat product, whether comminuted or of the boned type, is expressed through an extruding horn into a permeable tubular casing positioned interior of a fenestrate shaping cage. The casing is within the fenestrate cage and both are telescoped over the extruding horn. As the casing is filled, both it and the fenestrate cage are forced off of the extruding horn.

The block labeled "shaping and compacting" represents the step of applying pressure concurrently to both ends of the encased meat product subsequent to its removal from the stuffing machine. This step is performed on a suitable pressing machine and includes applying pressure to the slidable ends of the fenestrate cage for axially pressing the encased meat product into conformity with the interior dimensions of the fenestrate cage and simultaneously compressing the resilient means affixed to the end plates.

The "affixing" step comprises locking in place the compressed resilient means associated with the end plate of the fenestrate cage to maintain pressure on the encaged meat product during subsequent processing operations after the fenestrate cage is removed from the pressing machine.

The next step includes cooking or smoking of the encased meat product with the resilient axial pressure maintained on said meat product.

After this processing step the resilient pressure is released and the product is removed from the cage and is ready for delivery to consumers.

Referring now to the drawings wherein like reference numbers designate like parts, in FIGURES 2, 3 and 4 the reference numeral 10 designates a conventional meat forming press. This unit has a U-shaped forming chamber 13 wherein a boned meat mass 19 as shown in FIG. 4 is placed. Handle 14 is connected to a hinged, movable cover 12 for chamber 13 and is designed for manually opening the cover 12 and for engagement by a gripping bar 16. After closing cover 12 on the meat mass 19, as shown in FIG. 4, gripping bar 16 engages cover 12 upon actuation of pneumatic cylinder 18, to press, compact and shape the meat confined in chamber 13. A movable end wall of chamber 13 opposite extrusion horn 32 is comprised of flat disc 20 connected by appropriate piston rod 22 to a second air cylinder 24.

Air cylinder 18 and extruding cylinder 24 are pneumatically controlled by hand lever 17 through conventional linkage and air valves not shown. After the meat is shaped as by compressing and compacting to the outlines of the chamber formed by the walls of members 12, 13 and 20, the air cylinder 24 is actuated, thereby completely extruding meat mass 19 through an opening 15 in chamber 13 and into and through abutting horn structure 32.

Referring to FIG. 4, the horn structure is new to the art and is comprised of an elongated, tubular member 32 having affixed flange 34 at one end thereof designed to engage and slide in slots 36 of a base plate 30 affixed to press 10. Before expressing the meat mass to and through the cylindrical horn 32, a reinforced cellulose casing 40 is sheathed onto the exterior of horn 32. Casing 40 is provided with a cuff 41 about 2 inches long, infolded into the exit orifice of horn 32. A square wire cage mold 42 is additionally sheathed over casing 40 in place on horn 32. A spring end plate unit 50 hereinafter further described, is positioned in the cage with retaining member 80 and abutting the cuff of casing 40.

Sections "A," "B" and "C" (of FIG. 4) illustrate progressive steps in extrusion of a meat mass from press 10 enveloped in casing 40 from horn 32 into cage 42. "A" shows the meat mass 19 while completely within the forming chamber of press 10. "B" shows the meat mass 19 partially extruded into horn 32. The casing cuff 41 interior to the horn is engaged by the advancing end of the meat mass which in turn engages the end plate 56 fastened to the cage 42, thereby simultaneously unsheathing both the casing 40 and cage, from the horn 32 as shown at C.

Figure 5:
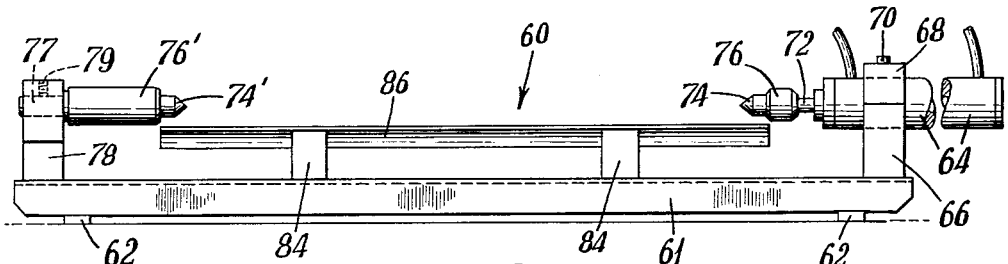
FIG. 5 is a side elevation of a meat mold press.
Figure 6:
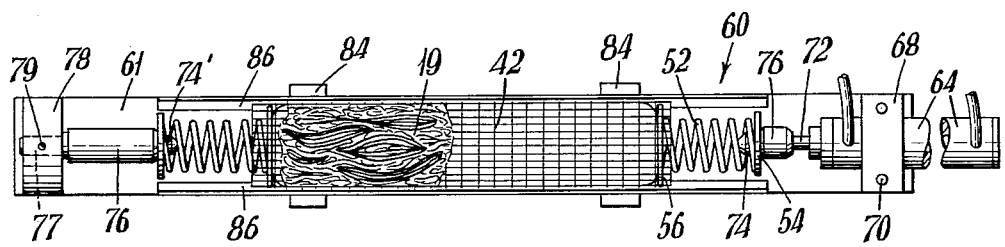
FIG. 6 is a plan view of a meat mold press loaded with a meat mass in a casing positioned within a fenestrate cage.
Figure 7:
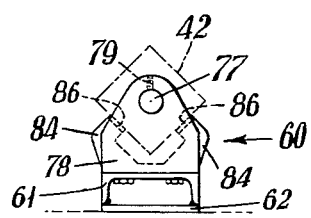
FIG. 7 is an end elevation of the press shown in FIG. 6.

Referring now to FIGURES 5, 6 and 7 the meat mold press 60 is comprised of a base 61, such as a structural steel channel shape about 5 ft. long and provided on the flanges thereof with a plurality of mounting plates 62 for fastening to a convenient work surface. An air cylinder 64 is horizontally disposed in a vertical clamping post 66 fastened to base 61. Clamping post 66 is machined to grip air cylinder 64 and through adjustment of clamping cap 68 fastened to post 66 by appropriate screw fastenings 70, permits axial adjustment of cylinder 64. The free end of air cylinder piston rod 72 is provided with retaining clip pilot portion 76 and coneshaped ram pintle portion 74.

Vertical pedestal 78 is fastened to base 61 at the machine end opposite air cylinder 64. Pedestal 78 is bored to receive shoulder shaft 77 which is affixed as a cantilever therein by set screw 79. Shaft 77 is positioned parallel to and centered on the axis of air cylinder 64. Shaft 77 is provided with pilot portion 76' and shouldered down to pintle portion 74'. However, this is merely a preferred embodiment, the pintle portions 74 and 74' could be replaced by a flat surface at the pilots 76 and 76'.

Horizontal support for wire cage 42, is provided on the press 60 by guide rails 86 fastened to and supported from base 61 by brackets 84, to position the cage preferably at 45° to the horizontal and on the center line of air cylinder 64 and shaft 77.

Figure 8:
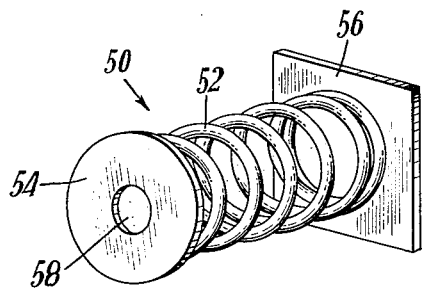
FIG. 8 is a perspective of a spring end plate for maintaining the encased mass under pressure during cooking.

Referring now to FIGURE 8, spring end plate unit 50 is made of a stainless steel coil spring 52 designed to carry a load of about 225 lbs. One end of spring 52 is fastened to stainless steel square end plate 56. The other end of spring 52 is fastened to a stainless steel round end plate 54 provided with central hole 58 of a diameter providing a free fit for pintles 74, 74'. The hole 58 is not essential and would not be used if a flat ended ram and stationary shaft not having pintles 74 and 74' were used.

Figure 9:
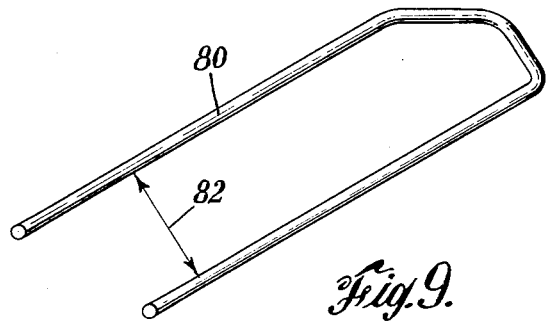
FIG. 9 is a perspective of a retaining pin for locking the spring end plate to the end of the fenestrate cage.

Referring now to FIGURE 9, retaining member 80 is made of ¼" diameter stainless steel rod bent to a U-shape with an inside span 82 made ⅛" wider than pilot 76, 76' diameter.

Figure 10:
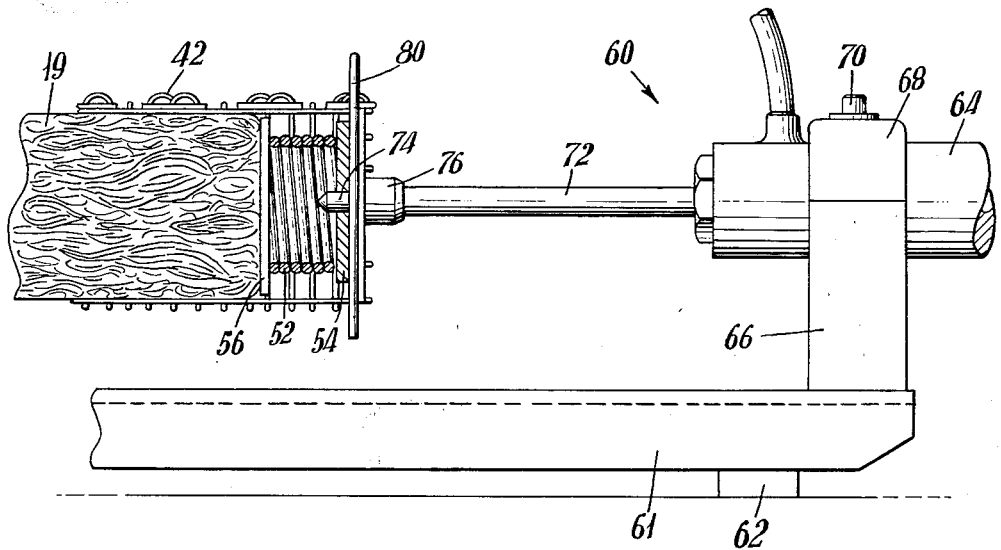
FIG. 10 is an enlarged side elevational view partly in section of the spring end plate and retaining pin in position within the cage after pressurizing.

As may be seen from FIG. 10, retaining member 80 is of sufficient length to pass entirely through the cage to lock the end plate assembly 50 in place.

FIG. 10 shows the press 60 with the meat mass under pressure. It has been found that subjecting the meat mass to between about 12–20 lbs. per sq. in. pressure gives satisfactory results. Springs 52 of end plate units 50 are fully compressed with all coils of the springs abutting, thereby transmitting the compressing force at right angles to press 60 axis from pintles 74, 74', through round end plate 54 to square end plate 56, thereby shaping the abutting ends of the meat mass square with the long axis thereof and retaining members 80 are in place, guided through appropriately chosen bars of cage 42 by pilot 76, 76' of press 60, to abut plate 54. It has been found that providing a compressing force of about 35 pounds in excess of that necessary to fully compress the springs 52, such as about 260 pounds, and that such compressed springs continuously applied a pressing pressure on the meat throughout the cooking operation.

The extension of shaft 77 cantilevered from pedestal 78 permits pintle 74' to enter the interior of the end of cage 42 without constraining the cage axially in the press. Guide rails 86 merely position the cage on the center line of press 60 and thus under pressure, the cage is substantially free to move axially, thereby permitting the meat mass to be pressurized equally concurrently at each end.

In a typical embodiment of the invention the meat mass 19 is placed in the chamber 13 of forming press 10 and the cover portion 12 forced closed to compress and shape the meat mass into conformity with the chamber 13. Next a cellulosic fibrous casing 40 is sheathed over extruding horn 32.

The end of the casing 40 extending beyond the terminus of the horn 32 is infolded into the interior of the horn 32 to form a cuff 41 of a depth such that on engagement of the cuff by the meat mass, the cuff is unfolded and covers the end of the meat mass when the latter is forced out of chamber 13.

An end plate assembly 50 is inserted in and temporarily secured in one end of a fenestrate shaping cage 42 by retaining pin 80. This assembly is then slipped on the extruding horn 32 and over the casing 40, whereby the end of the cage 42 having the pin fastened end plate assembly 50 is adjacent to the terminus of extending horn 32. Next, the air cylinder 24 is actuated causing piston rod 22 and attached disc 20 to force the meat mass 19 out of chamber 13 and through extruding horn 32 initially engaging casing cuff 41 and unfolding said cuff against end plate assembly 50. Further movement of the meat mass 19, pushing against the end plate assembly 50 conjointly unsheathes and fills the casing 40 while pushing therewith the fenestrate cage 42 longitudinally along the extruder horn 32. Upon complete rejection of the meat mass 19 from the chamber 13 and horn 32, the cage 42 and resultant encased mass are removed from the horn 32.

A second end plate assembly 50 is placed in the end of the fenestrate cage through which the meat mass was extruded.

The casing 40 is of such length that after stuffing with a meat mass there is a sufficient length of unfilled casing at the end immediately adjacent to flange 34 to form a closure for the extruded meat mass, as by folding, twisting or crumpling said unfilled length.

The fenestrate cage and its enclosed contents of encased meat is then placed in compacting press 60 movable piston rod 76 being retracted sufficiently to permit positioning of the cage on the rails 86. The retaining pin 80 of the first installed end plate assembly is removed. The air cylinder 64 is then actuated causing piston rod 72 to move toward the end plate assembly 50 immediately adjacent thereto. Upon engagement therewith the cage 42 is pushed firmly against the pilot portion 76' of cantilevered shaft 77 which contacts the end plate assembly 50 at this end of the cage. As further pressure is applied by piston rod 72, the springs 52 in each end plate assembly 50 are fully compressed and the meat mass within the cage between the two end plate assemblies is compacted and caused to conform intimately with the interior surfaces of the cage. With the pressure from the cylinder 64 still maintained so the springs 52 remain compressed, and preferably fully compressed for maintaining maximum possible pressure on the meat throughout subsequent cooking operation retaining pins 80 are inserted at each end of the cage 42 through the openings in the cage as near as possible to the plates 54, on the opposite side from the springs, to maintain same in the maximum compressed condition when the pressure applying members 76 and 76' are removed.

Next pressure is released from cylinder 64 causing piston rod 72 to withdraw from engagement with one end plate assembly. The fenestrate cage containing the compacted meat mass and having the two fully compressed end plate assemblies locked in place to maintain pressure thereon is removed from the press.

The thus encaged meat is processed by smoking and/or cooking, pressing pressure being maintained on the meat throughout the cycle by resilient means associated with the end plates 50 and locking means 80 and when this process is completed the retaining pins 80 are removed, the end plate assemblies withdrawn, and the cage is opened for removal of the encased, shaped meat product.

The thus encaged meat is processed by smoking and/or cooking and when this process is completed the retaining pins 80 are removed, the end plate assemblies withdrawn, and the cage is opened for removal of the encased, shaped meat product.

Figure 11:
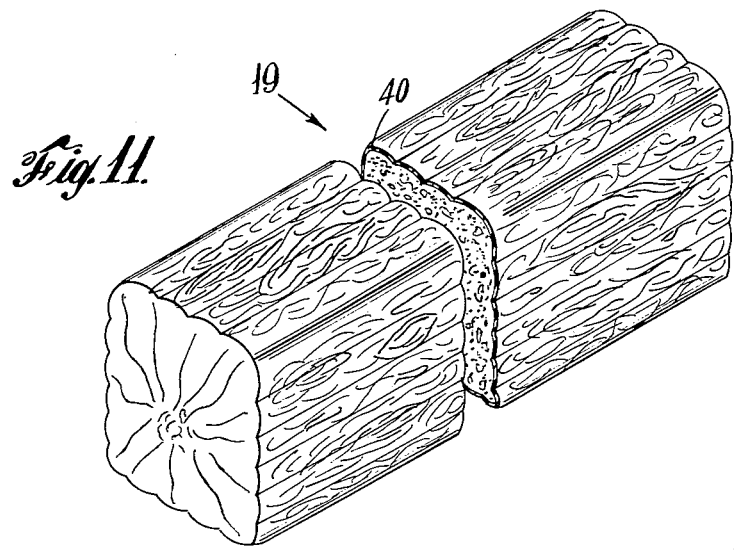
FIG. 11 is a perspective view of a meat product subsequent to removal from the cage.

FIG. 11 shows a finished meat product with the casing thereon after processing and removal from the wire shaping cage. The substantially square end resulting from the instant process is clearly shown.

The term fenestrate cage is intended to include not only a welded wire cage as set forth and described previously, but could also comprise a woven wire cage or a sheet metal cage having a plurality of openings therein.

While a substantially square cross section product is shown, it is to be understood that a round or oval cage could be used equally well, provided the end plate used conformed to the cross sectional shape of the cage, to give a flat end of substantially the same area as a cross section and the square corner set forth supra. The stainless steel element described in the embodiment is preferred because of its resistance to corrosion, however other non-corrosive metals such as Monel and other nickel alloys can be substituted as well as other metals suitably protected as by tinning or inert plastic coatings as will be understood by those skilled in the art.

As stated previously the instant process is of greatest utility when used with casings permeable to air or smoke to obtain optimum density of the final product.

The type of casing used in the instant process is preferably regenerated cellulose with a fiber web imbedded therein. Before such a casing is stuffed it is preferably soaked in water to make it pliable.

A novel method together with a preferred apparatus for effecting an improved shaped meat product has thus been disclosed and described. The resultant product has considerably less waste than shapes obtained with prior processes. In addition, the increased and more uniform density has considerable advantage in subsequent slicing and packaging operations.

While specific embodiments have been disclosed, it is to be understood that minor changes, substitutions and modifications could be made by a person skilled in the art without departing from the spirit and scope of the invention.

What is claimed is:

1. A method for providing a shaped meat product which comprises compressing and pre-shaping the meat product, extruding the meat into a casing completely interior of a fenestrate cage, end-pressing the meat within the cage between two end walls and maintaining pressure on the end walls during subsequent processing steps.

2. A method of preparing a shaped meat product which comprises compressing and pre-shaping the meat product, extruding the meat product into a tubular permeable cellulose casing within a fenestrate shaping cage, concurrently applying axial pressure to the encaged meat product at opposite ends thereof, resiliently maintaining said axial pressure on said opposite ends of the encaged meat product, cooking the encaged meat product while resiliently maintained under said axial pressure, and removing the encased meat product from the fenestrate cage subsequent to the cooking step.

3. A method for producing a shaped meat product which comprises compacting the meat product, expressing the product into a tubular permeable casing interior of a fenestrate shaping cage, axially applying pressure to both ends of the encaged meat product, resiliently maintaining said axial pressure on said both ends of the encaged meat product, and subsequently cooking said product while resiliently maintaining the axial pressure on the ends of the product.

4. A method for providing a shaped meat product which comprises compressing and pre-shaping the meat product, extruding the meat into a casing completely interior of a fenestrate restricting cage, concurrently applying pressure to the encaged meat product while restraining the girth shape and maintaining pressure on the end walls during the subsequent processing steps.

5. A method as set forth in claim 4 wherein the meat is extruded into a casing with no relative movement between casing and meat.

6. A method as set forth in claim 4 wherein the advancing end of the extruded meat initially engages and successively advances both casing and cage from the point of extrusion.

References Cited in the file of this patent

UNITED STATES PATENTS

| | | |
|---|---|---|
| 1,370,822 | Koch | Mar. 8, 1921 |
| 2,136,106 | Kern | Nov. 8, 1938 |
| 2,209,824 | Louisot et al. | July 30, 1940 |
| 2,337,406 | Opie | Dec. 21, 1943 |
| 2,565,245 | Lebovitz | Aug. 21, 1951 |
| 2,654,121 | Nelson | Oct. 6, 1953 |
| 2,860,991 | Christianson et al. | Nov. 18, 1958 |